(12) United States Patent
Rasmussen

(10) Patent No.: US 7,418,829 B2
(45) Date of Patent: Sep. 2, 2008

(54) APPARATUS FOR THE PRODUCTION OF ICE-CREAM MASS WITH SOLID INGREDIENTS

(75) Inventor: Henrik Guldmann Rasmussen, Tranbjerg J. (DK)

(73) Assignee: Tetra Pak Hoyer A/S (DK)

( * ) Notice: Subject to any disclaimer, the term of this patent is extended or adjusted under 35 U.S.C. 154(b) by 319 days.

(21) Appl. No.: 10/552,673

(22) PCT Filed: Mar. 30, 2004

(86) PCT No.: PCT/DK2004/000219

§ 371 (c)(1),
(2), (4) Date: Oct. 7, 2005

(87) PCT Pub. No.: WO2004/089102

PCT Pub. Date: Oct. 21, 2004

(65) Prior Publication Data

US 2006/0215485 A1 Sep. 28, 2006

(30) Foreign Application Priority Data

Apr. 7, 2003 (DK) ............................. 2003 00530

(51) Int. Cl.
*A23G 9/12* (2006.01)
(52) U.S. Cl. ........................ 62/342; 366/263; 426/524
(58) Field of Classification Search ........... 62/342–343; 366/293–296; 99/455; 426/524
See application file for complete search history.

(56) References Cited

U.S. PATENT DOCUMENTS 2,402,931 A * 6/1946 Thomas ........................ 62/343

(Continued)

FOREIGN PATENT DOCUMENTS

DE 39 18 268 7/1990

(Continued)

OTHER PUBLICATIONS

International Search Report; PCT/DK2004/000219; Jul. 9, 2004.

*Primary Examiner*—William E Tapolcai
(74) *Attorney, Agent, or Firm*—Cantor Colburn LLP

(57) ABSTRACT

An apparatus is disclosed for the production of frozen ice-cream mass with solid ingredients, which in the finished ice-cream mass will appear substantially as inclusions which distinguish themselves by flavour, appearance and/or consistency from the surrounding homogenous ice-cream mass. The apparatus comprises a first through-flow freezer for cooling of a continuous flow of mass, and a second through-flow freezer for further cooling of the continuous flow of mass, where a mixing-in arrangement for the mixing of solid ingredients into the continuous flow of mass is inserted between the through-flow freezer and the second through-flow freezer. It is hereby achieved that the mixing-in of the solid ingredients takes place in the frozen ice-cream mass when this has a temperature between –3° C. and –7° C. at which the viscosity of the mass is low. In order to achieve this uniform distribution of the solid ingredients, it is an advantage that the second through-flow freezer comprises a freezing cylinder and a conveyor screw which comprises a plurality of screw flights, at least two of which extend over the inlet part of the longitudinal extent of the conveyor screw, and where the outer edges of the two screw flights extend at different radial distance from the longitudinal axis. There is hereby achieved a better induction to the second through-flow freezer, and the inlet pressure can be reduced, typically to 4-6 bar.

14 Claims, 4 Drawing Sheets

U.S. PATENT DOCUMENTS

| | | | |
|---|---|---|---|
| 2,535,462 A * | 12/1950 | Stoelting et al. | 62/225 |
| 2,576,842 A | 11/1951 | Lehner | |
| 4,472,059 A * | 9/1984 | Klein et al. | 366/79 |
| 4,653,281 A * | 3/1987 | Van Der Veer | 62/71 |
| 4,802,140 A * | 1/1989 | Dowling | 366/79 |
| 4,872,761 A * | 10/1989 | Geyer | 366/79 |
| 4,878,760 A | 11/1989 | Newton et al. | |
| 5,024,066 A | 6/1991 | Goavec | |
| 5,403,611 A * | 4/1995 | Tomita et al. | 426/565 |
| 6,082,120 A | 7/2000 | Hoffmann et al. | |
| 6,355,290 B1 * | 3/2002 | Soehnlen et al. | 426/393 |
| 6,679,314 B2 * | 1/2004 | Frank | 165/63 |
| 6,844,018 B1 * | 1/2005 | Roth | 426/332 |

FOREIGN PATENT DOCUMENTS

| | | |
|---|---|---|
| JP | 56 029962 | 3/1981 |
| NL | 9 101 283 | 2/1993 |
| WO | WO 97/26800 | 7/1997 |
| WO | WO 97/39637 | 10/1997 |

\* cited by examiner

page 1 …

APPARATUS FOR THE PRODUCTION OF ICE-CREAM MASS WITH SOLID INGREDIENTS

TECHNICAL FIELD OF THE INVENTION

The present invention relates to an apparatus for the production of frozen ice-cream mass with solid ingredients, such as pieces of fruit, chocolate, nuts or other solid ingredients, which in the finished ice-cream mass will appear substantially as inclusions which distinguish themselves by flavour, appearance and/or consistency from the surrounding, homogenous ice-cream mass.

The ice-cream mass is preferably a so-called mix with a substantial content of mixed-in air, which in a continuous flow passes a first through-flow freezer where the mass is cooled, typically to −4° C. to −6° C. Hereafter, the solid ingredients are mixed in, after which the mass passes a second through-flow freezer where a uniform distribution of the solid ingredients is achieved, and where this second through-flow freezer comprises a freezing cylinder with an inner freezing surface which is regularly scraped by the rotation of a scraper arrangement. At the same time, the mass is cooled down in the second through-flow freezer, typically to −12° C. to −16° C., so that the mass can hereafter be given its final form, e.g. by extrusion, and is stored without an intermediate cooling process to the storage temperature in order to achieve that stability of the ice-cream mass given to the mass by the storage temperature.

DESCRIPTION OF THE RELATED ART

In the production by a known apparatus of ice-cream mass with solid ingredients, a continuous flow of mix is cooled in a through-flow freezer to −4° C. to −6° C. at the outlet of the through-flow freezer. The mix typically has a swelling degree of around 100%, i.e. that before the inlet to the through-flow freezer, air is mixed in a volume that corresponds to the volume of the liquid mix, and this air is distributed evenly in the mix as small air bubbles. The solid ingredients are mixed in the flow of ice-cream mass with a mixing-in arrangement after the outlet of the through-flow freezer, typically a vane- or wing-pump, which provides a uniform relationship between the ice-cream mass and the solid ingredients. Thereafter, the flow of ice-cream mass passes a mixing arrangement which brings about a uniform distribution of the solid ingredients in the ice-cream mass.

The ice-cream mass is thereafter formed into the finished products which are packed in a packing station and pass a freezing apparatus which quickly cools them to a storage temperature of typically −12° C. to −18° C., so that a stability of the product is achieved, and the products are then stored for further distribution.

In the production of ordinary ice-cream mass without solid ingredients, it has proved to be advantageous to use a second through-flow freezer after the first through-flow freezer for cooling the mass to between −10° C. and −20° C. or lower as preparation for the extrusion of the mass for the formation of the final ice-cream bodies, which can be packed and finally stored without passing an intermediate freezing apparatus which is expensive in initial costs, entails operational costs and which takes up space. The second through-flow freezer is typically of the same type as the first through-flow freezer, which comprises a conveyor screw which scrapes off the layer of ice which is formed on the inner side of a freezing cylinder. However, the second through-flow freezer should be adapted to suit the different physical characteristics of the ice-cream mass, such as the greater viscosity. Through-flow freezers which function in this manner are known, for example from DE-A-39 18 268 and WO 97/26800.

The production of ice-cream mass with solid ingredients by use of a plant with both first and second through-flow freezer, so that the ice-cream mass is cooled to between −10° C. and −20° C. or lower, requires however the adaptation of both the mixing-in arrangement which mixes-in the solid ingredients in the ice-cream mass after the outlet of the second through-flow freezer, as well as the mixing arrangement which effects a uniform distribution of the solid ingredients in the ice-cream mass, the reason being that the higher viscosity of the ice-cream mass with the lower temperature gives rise to a greater physical loading of those parts of the mixing-in arrangement and the mixing arrangement which are in engagement with and are to manipulate the ice-cream mass.

However, the manipulation in the mixing-in arrangement and the mixing arrangement of the ice-cream mass with the lower temperature has some unintentional effects. Due to the high viscosity of the ice-cream mass, a substantial mechanical effect is imparted to the mass, which is not only costly in energy consumption but also heats the mass with up to several degrees Centigrade, which requires additional energy consumption for cooling the mass, and the manipulation also reduces the swelling of the ice-cream mass because the higher viscosity of the mass entails that the forces between the parts of the mixing-in arrangement and the mixing arrangement, which manipulate the mass, are relatively high.

BRIEF SUMMARY OF THE INVENTION

It is thus an object of the present invention to provide an apparatus for the production of low-temperature ice-cream mass with solid ingredients, said mass typically having a temperature of between −10° C. and −20° C., where a reduction is achieved in the above-mentioned disadvantages in the form of consumption of mechanical energy for mixing-in and distribution of the solid ingredients, the increase in temperature of the ice-cream mass hereby, and/or hereby the reduction in the swelling of the ice-cream mass.

This object is achieved with an apparatus according to the present invention, which comprises a first through-flow freezer for cooling the continuous flow of mass, and a second through-flow freezer for further cooling of the continuous flow of mass, where a mixing-in arrangement for the mixing-in of solid ingredients into the continuous flow of mass is inserted between the first through-flow freezer and the second through-flow freezer instead of being placed after the second through-flow freezer. It is hereby achieved that the mixing-in of the solid ingredients takes place in the frozen ice-cream mass when it has a higher temperature, typically between −1° C. and −10° C. and preferably between −3° C. and −7° C., where the viscosity of the mass is lower, and herewith less use shall be made of mechanical energy and a weaker action of force for the mixing-in of solid ingredients, and it is also achieved that a mixing arrangement becomes superfluous, the reason being that the manipulation of the ice-cream mass in the second through-flow freezer results in a uniform distribution of the solid ingredients in the ice-cream mass at the outlet of the second through-flow freezer.

In order to achieve this uniform distribution of the solid ingredients, it is an advantage that the second through-flow freezer comprises a freezing cylinder with an inner, rotation-symmetrical freezing surface, which is regularly scraped by the rotation of a scraping arrangement. However, several of such known through-flow freezers, which can be used for the present purpose, demand a quite high inlet pressure, often of the order of 12-14 bar, so that the ice-cream mass can be drawn through the through-flow freezer. The mixing-in arrangement shall herewith be able to mix-in the solid ingredients and deliver the ice-cream mass at a high pressure, which is difficult with a wing-pump which is preferred to be used as mixing-in arrangement, or a pump providing pressure must be arranged between the mixing-in arrangement and the inlet to the second through-flow freezer.

In order to relieve this problem, it has shown to be advantageous for the scraping arrangement to be a conveyor screw which comprises a plurality of screw flights, each of which extends in a helical path around a longitudinal axis, where at least two screw flights extend over the same part of the longitudinal extent of the conveyor screw, wherein the outer edge of the two screw flights extend at different radial distance from the longitudinal axis. A better induction is hereby achieved for the second through-flow freezer, and the inlet pressure can be reduced typically to 4-6 bar, and a number of other advantages are also achieved. It is particularly advantageous for the reducing of the inlet pressure if the said least two screw flights extend over an inlet end part of the conveyor screw.

The present invention relates to an apparatus for the production of ice-cream mass with solid ingredients, and which comprises a first through-flow freezer for cooling of a continuous flow of mass, a second through-flow freezer for further cooling of the continuous flow of mass, and a mixing-in arrangement for mixing solid ingredients into the continuous flow of mass between the first through-flow freezer and the second through-flow freezer. Both of the through-flow freezers are preferably positively conveying, i.e. that they comprise a freezing cylinder, the inner wall of which is cooled and surrounds a rotation-symmetrical cavity, in which a conveying, rotating element such as a conveyor screw is driven by a driving element for the scraping of the inner wall and the conveyance of the mass from an inlet end to an outlet end of the through-flow freezer.

The first through-flow freezer typically cools the mass to between $-1°$ C. and $-10°$ C., preferably between $-3°$ C. and $-7°$ C. at the outlet of the first through-flow freezer, while the second through-flow freezer typically cools the mass to between $-10°$ C. and $-20°$ C., preferably between $-12°$ C. and $-16°$ C. at the outlet of the second through-flow freezer.

The mixing-in arrangement preferably comprises a wing pump.

As mentioned, it is preferred that the second through-flow freezer comprises a freezing cylinder with an inner, rotation-symmetrical freezing surface which is regularly scraped by rotation of a scraping arrangement, and more specifically that it is preferred that the scraping arrangement is a conveyor screw which comprises a plurality of screw flights, each of which extends in a helical path around a longitudinal axis, the outer edge of the two screw flights extending at different radial distances from the longitudinal axis.

The screw flights are typically secured to an inner, closed core, which can be of cylindrical configuration but also of other configurations, e.g. truncated cone, in order to vary the open cross-sectional area and hereby the speed of conveyance. The outer edge of the screw flights will for the longest screw flights normally extend to a radius which is constant along the longitudinal axis of the conveyor screw, so that the conveyor screw fits into a cylindrical cavity, but also this radius can be varied along the longitudinal axis so that the conveyor screw fits into a truncated cone cavity, for in this manner to vary the open cross-sectional area as well as the surface area of the cavity with which the conveyed mass comes into contact during the conveyance. The latter can be of advantage if, for example, the transmission of heat through the surface is to be promoted close to the outlet end of the conveyor screw.

In order to reduce the inlet pressure for a conveying apparatus with the said conveyor screw, it is an advantage that the said least two screw flights extend over an inlet end part of the conveyor screw so that the radially shorter screw flights, e.g. 0.85-0.98 times the radius of the longer screw flight, promote conveyance close to the inlet end and herewith increase the inlet suction of the conveying apparatus.

It is particularly advantageous that at least three screw flights extend over the inlet end part of the conveyor screw, where one of the least three screw flights extends at a greater radial distance from the longitudinal axis than the at least two other screw flights.

In a preferred embodiment, the at least two screw flights which extend at a smaller radial distance from the longitudinal axis, extend from the inlet end and for different longitudinal distance from the inlet end, so the assisting transport effected by these radially shorter screw flights decreases gradually from the inlet end, and the mixing of the mass some distance into the conveyor is hereby increased, the result being an increase in the homogeneity of the mass. The radially shorter screw flights mainly effect the transport of the warmer ice-cream mass with a lower viscosity, and as the temperature gradually falls from the inlet end towards the outlet end, the amount of ice-cream mass with the lower viscosity decreases and herewith that amount which the radially shorter screw flights are required to transport.

It has shown to be advantageous that the pitch of the screw flights at the inlet end of the conveyor screw is relatively high, i.e. 0.9 to 1.4, preferably 1.1 to 1.3, as opposed to the normal pitch of the screw flights in such conveyor screws of 0.5 to 1, where the pitch is given as the ratio between the length of one screw flight in the longitudinal direction of the conveyor screw and the outer diameter of the longest screw flight. With a high screw pitch, a higher transport length per revolution of the conveyor screw is achieved, and the scraping frequency is reduced per length unit of the mass conveyed. The speed of rotation can herewith also be lower for the transport of a given volume of the mass.

For conveyor screws used in connection with through-flow freezers, it is common to use a rotation in the range of 100-1000 revolutions per minute, lowest for larger cylinders and highest for cylinders with a small diameter. For a representative conveyor screw with an inner screw diameter of 105 mm, the speed will normally be between 200-600 revolutions per minute, which with a typical screw pitch of between a whole and half times the outer diameter of the worm will result in an axial scraping speed of 1-3.5 m/sec.

With the invention it has been found to be possible and optimal to operate with a rotation speed right down to 10-50 revolutions per minute, preferably with 20-35 revolutions per minute, as well as with a screw pitch which is unusually great. The scraping speed will hereby have a reduced value of only 1-10% of the conventional value, but in return it has been seen to be possible to realise the process in practice. More specifically, what is involved is a practically usable compromise between the power of the energy supplied as being sufficient for transport and scraping-off without giving rise to undesired heat. It is a surprising result that the low scraping speed and the associated low scraping frequency is adequate to keep the surface of the heat exchanger free to such a degree that it is possible to operate with a practically acceptable efficiency of the heat exchanger.

It has also shown to be advantageous that the pitch of the screw flights is reduced along the longitudinal direction of the conveyor screw to 0.7 to 1, preferably 0.8 to 0.9, at an outlet end of the conveyor screw. The pressure towards the outlet end is hereby somewhat increased, and the ice-cream mass or other mass which is transported by means of the conveyor screw assumes a suitable pressure at the outlet end for the feeding into subsequent processing machines such as extruding plant. As mentioned earlier, a corresponding effect can be achieved by increasing the diameter of the core of the conveyor screw, but where the manufacture is concerned it is preferred to reduce the pitch of the screw flights instead.

Preferably, in order to achieve a complete scraping of the inner surface of the freezing cylinder by rotation of the conveyor screw, it is advantageous that over the whole length of the conveyor screw's longitudinal direction there is at least one screw flight which extends to a given greatest radius.

If the conveyor screw is configured in such a manner that the screw flights which extend to the greatest radial distance from the longitudinal axis extend discontinuously in the longitudinal direction, so that a peripherally extending opening exists between these screw flights at least at one point along the longitudinal direction, it has shown that fluctuations in the discharge amount per unit of time can be reduced and actually completely eliminated. It has proved to be expedient with from two to eight of such openings along the full length of the conveyor screw, preferably from three to six. Another way in which to determine how many openings it is advantageous to have is for the average distance in the longitudinal direction between the openings to be from 1 to 4 times the outer diameter of the screw, preferably from 1.5 to 2.5. The effect of the openings is that the pressure difference between the pressure and suction sides of the screw flights is equalised, which has shown to give a more even distribution of pressure in the mass. The high viscosity of the mass has the result that the pressure differences in the transported mass build up high local pressure gradients to a greater extent than for masses of low viscosity, inasmuch as the mass does not flow immediately due to the pressure gradient and hereby equalizes it.

In order to achieve the optimum effect of the said opening or openings, in a preferred embodiment the openings extend over 120 to 240° of the periphery, preferably over 150 to 210° of the periphery.

BRIEF DESCRIPTION OF THE FIGURES

The invention is illustrated by an example shown in the attached drawing, where.

Figure 1:
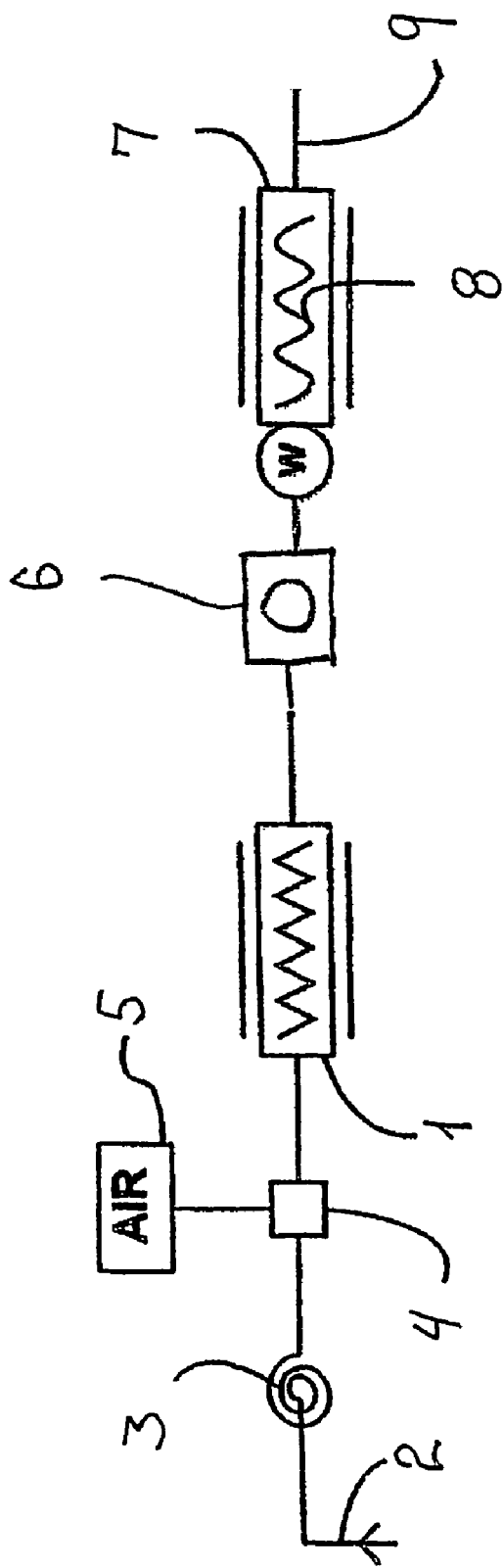
FIG. 1 is a schematic diagram illustrating a plant according to the invention.

All measurements in the drawing are shown in millimetres.

DETAILED DESCRIPTION OF AN EXAMPLE EMBODIMENT OF THE INVENTION

The production plant for the production of extruded ice-cream products, as illustrated schematically in FIG. 1, comprises a preceding through-flow freezer 1 which, from a supply 2, is supplied with "mix" which passes a pump 3 and a mixing compartment 4 in which this mix is mixed with air from a source 5 of compressed air in order to achieve a swelling of traditionally about 100%. This prepared ice-cream substance is cooled in the through-flow freezer 1 down to a temperature of approx. −5° C. Thereafter, the ice-cream mass produced hereby passes a mixing-in arrangement 6 in the form of a wing pump 6, where the solid ingredients are fed in to the suction side of the pump 6 together with the ice-cream mass, so that a constant ratio between the ice-cream mass and the solid ingredients is achieved.

The cooled substance is fed further to a subsequent through-flow freezer 7 for subsequent extrusion at a temperature of −10° to −20° C., so that the cut-out ice bodies can be packed for direct transfer to the storage freezer. The subsequent through-flow freezer 7 is positively conveying, i.e. it comprises a conveyor screw 8 driven by a motor, which here is designated by W (work) to indicate that this driving will result in a certain supply of power to the ice-cream mass, partly due to the transport function itself, and partly due to the scraping work which is to be carried out by the conveyor screw 8 in scraping off the solid, frozen ice-cream mass. The ice-cream mass is led out via an outlet pipe 9 for further processing, such as extrusion.

Figure 2:
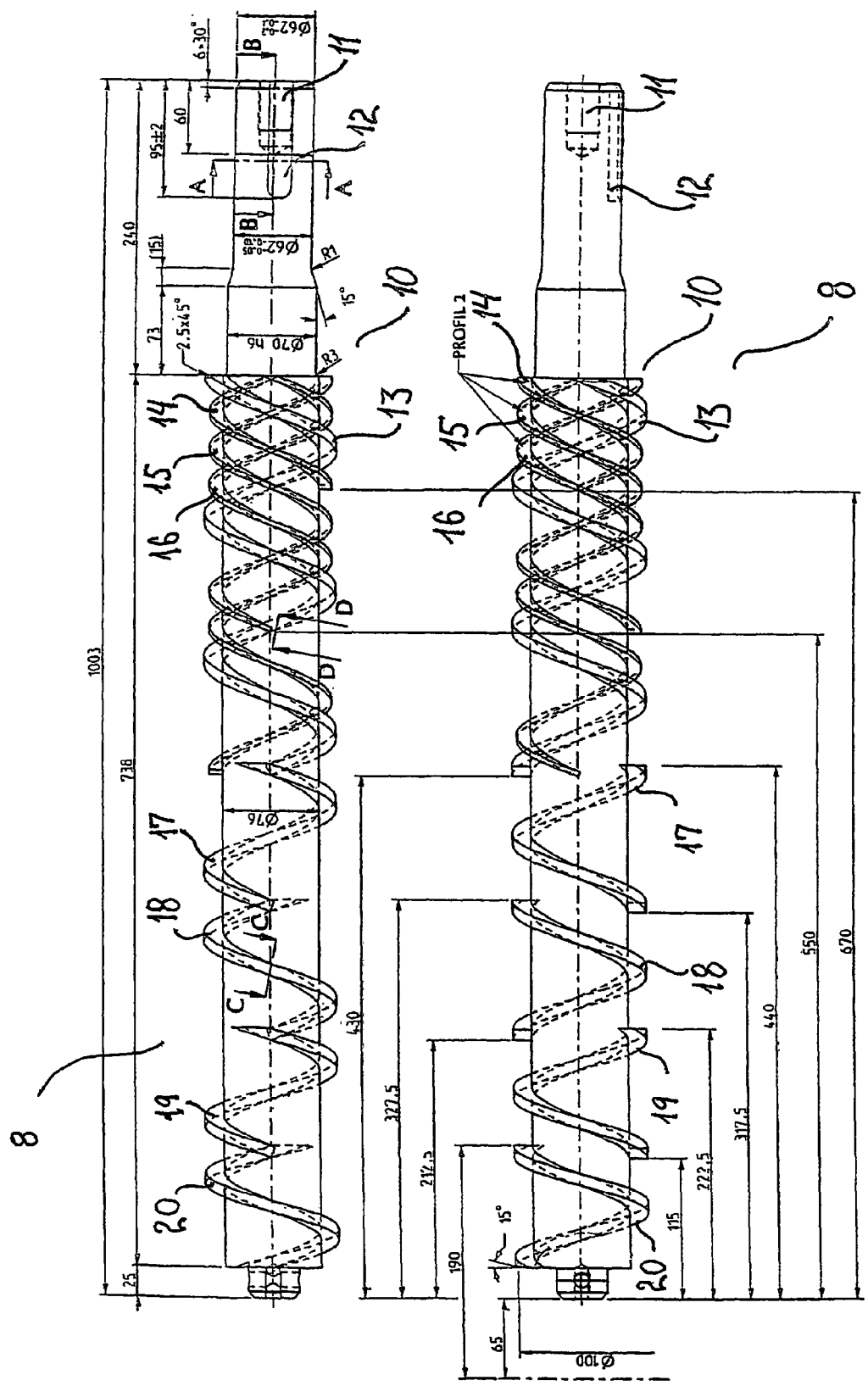
FIG. 2 shows a conveyor screw according to the invention seen from two sides.
Figure 3:
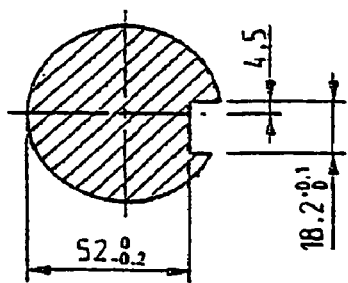
FIG. 3 shows a cross-section A-A of the conveyor screw shown in FIG. 2.
Figure 4:
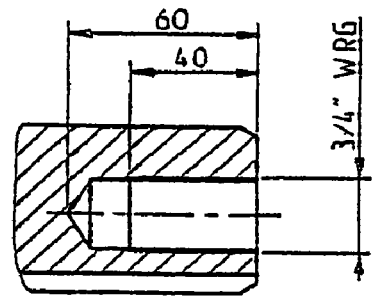
FIG. 4 shows a cross-section of the conveyor screw shown in FIG. 2.

The conveyor screw 8 is shown in detail in FIG. 2, and at its inlet end 10 comprises a centre hole 11, shown in section B-B in FIG. 4, for seating of the conveyor screw 8, and a groove 12, shown in section A-A in FIG. 3, for coupling with the motor W. From the inlet end there extends one scraping screw flight 13 with an outer diameter of 105 millimetres, and parallel with this, also from the inlet end 10, three further assisting screw flights 14, 15, 16 with an outer diameter of 97.8 millimetres extend in a manner whereby they do not reach the wall of the freezing cylinder in the subsequent through-flow freezer 7.

The distance in the longitudinal direction of the conveyor screw 8 between the beginning of the screw flights 13, 14, 15, 16 and the end of the last screw flight 20 is 738 millimetres. The first assisting screw flight 14 ends 68 millimetres in the longitudinal direction from its beginning, the second assisting screw flight 15 ends 188 millimetres in the longitudinal direction from its beginning, while the third assisting screw flight 16 ends 298 millimetres in the longitudinal direction from its beginning. The scraping screw flight 13 is similarly discontinued 298 millimetres in the longitudinal direction from its beginning, and is succeeded by a second scraping screw flight 17 which starts at 10 millimetres shorter distance from the inlet end 10 than where the first scraping screw flight 13 ends, but with a displacement of half a turn so that an opening appears which extends peripherally over 180°. The two scraping screw flights 13, 17 thus overlap each other in the longitudinal direction, and the whole of the wall in the subsequent through-flow freezer 7 is herewith scraped by a screw flight 13, 17.

Figure 5:
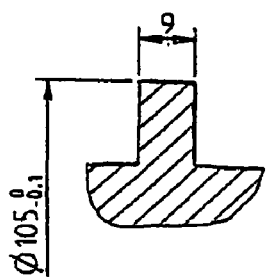
FIG. 5 shows a section of a cross-section C-C of the conveyor screw shown in FIG. 2.
Figure 6:
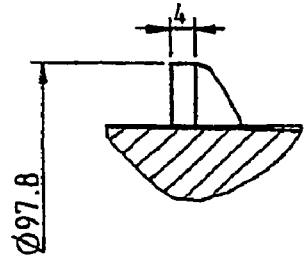
FIG. 6 shows a section of a cross-section D-D of the conveyor screw shown in FIG. 2.
Figure 7:
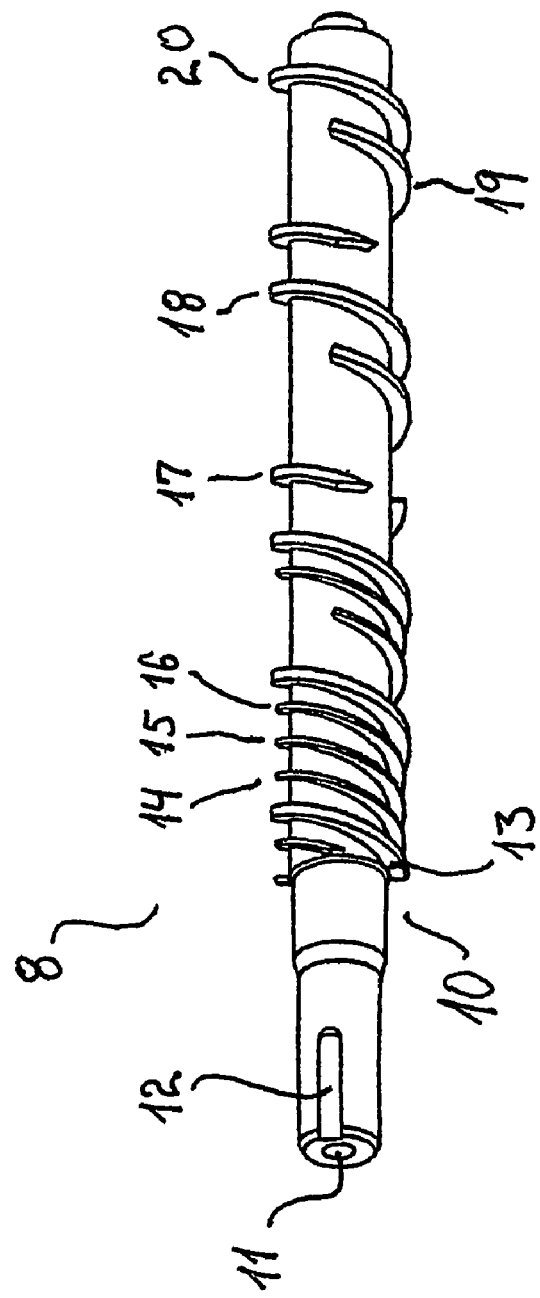
FIG. 7 shows a perspective view of the conveyor screw shown in FIG. 2.

The pitch of the first screw flights 13, 14, 15, 16 is 120 millimetres, i.e. a screw flight extends over 120 millimetres in the longitudinal direction. The non-dimensional pitch is 1.14, the outer diameter of the conveyor screw 8 being 105 millimetres. The second scraping screw flight has a lower pitch, namely 112.5 millimetres or 1.07, and extends over 122.5 millimetres, after which it is succeeded by a third, a fourth and a fifth scraping screw flight 18, 19, 20 with decreasing pitches of 1, 0.93 and 0.86 respectively, where each screw flight 18, 19, 20 overlaps the preceding screw flight by 10 millimetres, but is similarly displaced half a turn in relation to this. A cross-section C-C of a scraping screw flight 18 is shown in FIG. 5, and the end of an assisting scraper screw flight 15 is shown in FIG. 6. Finally, the whole of the conveyor screw 8 is shown in perspective in FIG. 7.

The ends of the screw flights 13-20 should be carefully rounded in order to prevent the formation of large pressure gradients near the ends, which can otherwise result in the air being locally drawn out of the ice-cream mass with a smaller degree of swelling and larger air pockets as a consequence. On the pressure side, i.e. that side which is foremost and which scrapes the inner surface of the freezing cylinder, the scraping screw flights 13, 17, 18, 19, 20 can possibly be provided with a scraping projection in order to ease the scraping of ice from the surface. A large number of configurations of scraping projections are known from the literature.

The invention claimed is:

1. Apparatus for production of ice-cream mass with solid ingredients, comprising:
   a first through-flow freezer for cooling of a continuous flow of mass to between −1° C. and −10° C. at an outlet of the first through-flow freezer,
   a second through-flow freezer for further cooling of the continuous flow of mass, and
   a mixing-in arrangement for mixing of solid ingredients into the continuous flow of mass between the first through-flow freezer and the second through-flow freezer.

2. Apparatus according to claim 1, where the second through-flow freezer cools the mass to between −10° C. and −20° C. at an outlet of the second through-flow freezer.

3. Apparatus according to claim 1, where the mixing-in arrangement comprises a wing pump.

4. Apparatus according to claim 1, where the second through-flow freezer comprises a freezing cylinder with an inner, rotation-symmetrical freezing surface which is regularly scraped by rotation of a scraping arrangement.

5. Apparatus according to claim 4, where the scraping arrangement is a conveyor screw which comprises a plurality of screw flights, each of which extends in a helical path around a longitudinal axis, where at least two screw flights extend over the same part of the longitudinal extent of the conveyor screw, and wherein the outer edges of the two screw flights extend at a different radial distance from the longitudinal axis.

6. Apparatus according to claim 5, wherein the at least two screw flights extend over an inlet end part of the conveyor screw.

7. Apparatus according to claim 6, wherein at least three screw flights extend over the inlet end part of the conveyor screw, and where one of the at least three screw flights extends at a greater radial distance from the longitudinal axis than the at least two other screw flights.

8. Apparatus according to claim 7, wherein the at least two screw flights which extend at a smaller radial distance from the longitudinal axis extend from the inlet end and at a different longitudinal distance from the inlet end.

9. Apparatus according to claim 5, where a pitch of the screw flights at an inlet end of the conveyor screw is 0.9 to 1.4.

10. Apparatus according to claim 5, wherein a pitch of the screw flights decreases along a length of the conveyor screw to 0.7 to 1 at an outlet end of the conveyor screw.

11. Apparatus according to claim 5, wherein at all places along a length of the conveyor screw there is at least one screw flight which extends at a given greater radius, so that a whole of the inner wall of a cylindrical cavity in which the conveyor screw is placed is scraped by rotation of the conveyor screw.

12. Apparatus according to claim 11, wherein the screw flights which extend at a greater radial distance from the longitudinal axis extend discontinuously in the longitudinal direction, so that a peripherally extending opening exists between these screw flights at least at one position along the longitudinal direction.

13. Apparatus according to claim 12, wherein said opening or openings extend over 120° to 240° of the periphery.

14. Apparatus according to claim 5, wherein a second through-flow freezer comprises a driving element (W) which is arranged to drive the conveyor screw at a speed of from 10 to 50 revolutions per minute.

* * * * *

UNITED STATES PATENT AND TRADEMARK OFFICE
CERTIFICATE OF CORRECTION

PATENT NO. : 7,418,829 B2
APPLICATION NO. : 10/552673
DATED : September 2, 2008
INVENTOR(S) : Rasmussen Page 1 of 1

It is certified that error appears in the above-identified patent and that said Letters Patent is hereby corrected as shown below:

Title Page, Item (73), Assignee, delete "Tetra Pak Hoyer A/S (DK)" and insert therefor --Tetra Laval Holding & Finance S.A., (CH)--.

Signed and Sealed this

Eighteenth Day of August, 2009

David J. Kappos
*Director of the United States Patent and Trademark Office*